United States Patent [19]
McAlister et al.

[11] Patent Number: 5,130,112
[45] Date of Patent: Jul. 14, 1992

[54] METHOD FOR RECOVERING HIGH GRADE PROCESS ENERGY FROM A CONTACT SULFURIC ACID PROCESS

[75] Inventors: Donald R. McAlister, Ballwin; Daniel R. Schneider, Chesterfield, both of Mo.

[73] Assignee: Monsanto Company, St. Louis, Mo.

[21] Appl. No.: 498,338

[22] Filed: Mar. 23, 1990

[51] Int. Cl.$^5$ .............................................. C01B 17/74
[52] U.S. Cl. .................................. 423/522; 423/530; 423/541 R; 423/541 A
[58] Field of Search .............. 423/522, 543, 530, 531, 423/541 R, 541 A

[56] References Cited

U.S. PATENT DOCUMENTS

| | | | |
|---|---|---|---|
| 2,017,676 | 10/1935 | Von Girsewald et al. | 423/522 |
| 4,478,809 | 10/1984 | McAlister et al. | 423/522 |
| 4,533,537 | 8/1985 | Dittmar et al. | 423/522 |
| 4,576,813 | 3/1986 | McAlister et al. | 423/522 |
| 4,590,047 | 5/1986 | Donnelly et al. | 423/522 |
| 4,670,242 | 6/1987 | McAlister et al. | 423/522 |
| 4,996,038 | 2/1991 | McAlister et al. | 423/522 |

OTHER PUBLICATIONS

Olsen, *Unit Processes and Principles of Chemical Engineering,* D. Van Nostrand Co., Inc. 1932, pp. 1-3.
Boyer et al., *Metals Handbook Desk Edition,* American Society for Metals, 1985, p. 15.2

Primary Examiner—Michael Lewis
Assistant Examiner—Stephen G. Kalinchak
Attorney, Agent, or Firm—Senniger, Powers, Leavitt & Roedel

[57] ABSTRACT

An improved process for the recovery of high grade energy from a contact sulfuric acid manufacturing process. Improvements include: injection of steam between an intermediate catalyst stage and a heat recovery absorption tower and/or a heat exchanger for transfer of heat from conversion gas to high pressure boiler feed water; use of a condensing economizer for recovery of the vapor phase energy of formation of sulfuric acid from a wet conversion gas; and use of heat recovery system absorption acid for preheating air to a sulfur burner, the heat transferred to the combustion air being recovered at high pressure and temperature in a waste heat boiler.

18 Claims, 3 Drawing Sheets

VAPOR PHASE REACTION OF EQUIMOLAR H₂O/SO₃ MIXTURE

CONDENSATE COMPOSITION AFTER STEAM INJECTION

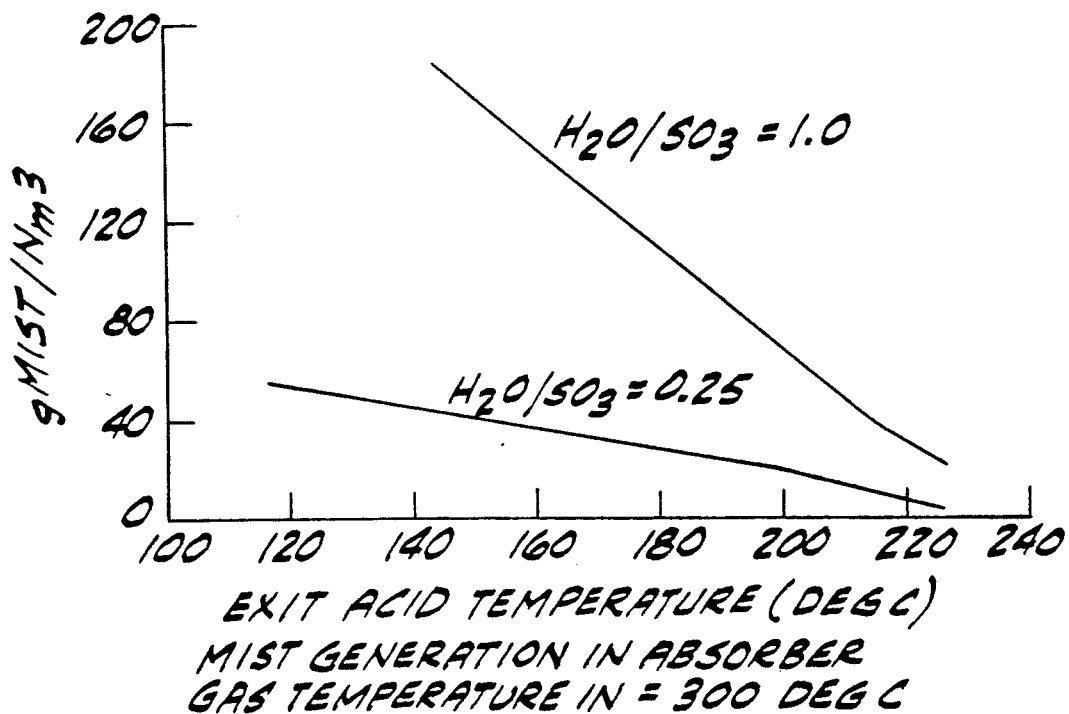

METHOD FOR RECOVERING HIGH GRADE PROCESS ENERGY FROM A CONTACT SULFURIC ACID PROCESS

BACKGROUND OF THE INVENTION

This invention is directed to various improvements by which high grade energy is recovered in the contact process for the manufacture of sulfuric acid. More particularly, the invention is directed to improvements in which the energy of low pressure steam is recovered at high temperature, the vapor phase heat of formation of sulfuric acid in wet conversion gas is recovered in an economizer, and absorption heat is used to preheat oxygen-containing gas used for combustion of a source of sulfur in generation of sulfur dioxide to be fed to the converter. The energy recovered in the latter step is upgraded by transfer of heat from the sulfur dioxide combustion gas to a high temperature heat transfer fluid in a waste heat recovery unit.

Until recently, only about 55% to 60% of the heat generated in the contact sulfuric acid process was recovered in useful form. A major improvement in energy recovery has been provided in the processes of McAlister and Ziebold U.S. Pat. Nos. 4,576,813 and 4,670,242, and McAlister copending application Ser. No. 369,301, filed June 21, 1989, all of which describe processes for the recovery of the heat of absorption in the form of medium pressure steam. In the heat recovery system described in these disclosures, an absorption tower is operated at high temperature and heat is transferred from the absorption acid to produce medium pressure steam. By maintaining the acid concentration in the range typically of 99% to 100%, alloy heat exchangers may be used for recovery of the absorption heat. Practice of the McAlister and Ziebold processes allows process heat energy recovery capability to be increased to the range of 90 to 95%. The process of pending Ser. No. 369,301, which is expressly incorporated herein by reference, describes the particular application of absorption heat recovery to a process in which sulfuric acid is produced from a wet sulfur dioxide-containing gas.

SUMMARY OF THE INVENTION

A central object of the present invention is the provision of an improved process in which process energy is recovered from a contact sulfuric acid manufacturing process in high grade form. More particular objects of the present invention include the recovery at high temperature of the heat generated by vapor phase formation of sulfuric acid in a wet conversion gas; the upgrading of absorption energy recovered in an absorption heat recovery zone; and the upgrading of low pressure steam by transfer of the energy contained in the steam to a higher temperature heat transfer fluid.

Briefly, therefore, the present invention is directed to an improvement in a process for the manufacture of sulfuric acid. The process comprises combustion of a source of sulfur and an oxygen-containing gas in a burner to produce a combustion gas stream comprising sulfur dioxide and oxygen, passage of the gas stream through a plurality of catalyst stages for progressive conversion of sulfur dioxide to sulfur trioxide, recovery of heat in useful form by cooling the gas stream exiting the catalyst stages, passage of the cooled gas stream from one of the stages through an absorption zone where the gas stream is contacted with sulfuric acid for removal of sulfur trioxide from the gas phase, and return of the gas stream from the absorption zone to a further stage of the plurality of catalyst stages. The improvement comprises introducing water vapor into the gas stream at a point between the burner and the absorption zone. At least a portion of the water vapor reacts with sulfur trioxide in the gas phase to produce sulfuric acid and thereby generate the heat of formation of sulfuric acid in the gas phase. Heat energy equivalent to at least a portion of the gas phase heat of formation of sulfuric acid is recovered from the gas phase, the heat being recovered in steam having a pressure at least about 2.5 bar higher than the pressure of the water vapor as introduced into the gas stream.

The invention is further directed to an improvement in a process of the type generally described above in which the gas stream that has exited from said one stage contains vapor phase sulfuric acid that has been formed by the reaction of water vapor and sulfur trioxide in the gas phase. The improvement comprises cooling the gas stream containing vapor phase sulfuric acid by transfer of heat to a heat transfer fluid in an economizer. The economizer comprises an indirect heat exchanger comprising heat transfer wall means between the gas stream and the heat transfer fluid. At least a portion of the wall means on the gas stream side thereof is at a temperature below the dew point of the gas stream entering the heat exchanger. Sulfuric acid thereby condenses from the gas stream on the wall means.

The invention is further directed to an improvement in a process for the manufacture of sulfuric acid, the process comprising combustion of a source of sulfur with an oxygen-containing gas in a burner to produce a combustion gas stream comprising sulfur dioxide and oxygen, recovery of a portion of the heat of combustion by transfer of heat from the combustion gas to a heat transfer fluid, catalytic oxidation of sulfur dioxide contained in the gas to produce a conversion gas containing sulfur trioxide, absorption of components of the conversion gas in sulfuric acid in a heat recovery absorption zone, and recovery of at least a portion of the heat of absorption from the absorption acid discharged from the absorption zone. The improvement comprises heating the oxygen-containing gas in an indirect heat exchanger comprising a preheater for the burner, thereby contributing heat to the combustion gas. The oxygen-containing gas is heated with heat transferred from the absorption acid discharged from the heat recovery absorption zone. Steam is generated at a pressure of at least about 25 bar by transfer of heat from the combustion gas.

Other objects and features will be in part apparent and part pointed out hereinafter.

BRIEF DESCRIPTION OF THE DRAWINGS

FIG. 4 contains plots of sulfuric acid mist formation in the heat recovery absorption zone as a function of temperature and equivalent water/sulfur trioxide ratio.

DESCRIPTION OF THE PREFERRED EMBODIMENTS

In accordance with the present invention, significant enhancements are achieved in the form in which energy is recovered from a contact sulfuric acid process. These improvements are adapted to provide further improvement in the heat recovery processes described in the above mentioned patents of McAlister and Ziebold, and in the pending application of McAlister. They are particularly adapted for use in a wet gas contact process of the type described in the latter application.

It will be understood that each of these improvements may also find application in processes in which dry sulfur dioxide-containing gas is supplied to the sulfur trioxide converter. Moreover, regardless of whether absorption heat recovery technology is used, injection of water vapor into the conversion gas can be used to recover the vapor phase heat of formation of sulfuric acid at high temperature, and a condensing economizer can be used to maximize the amount of high grade energy recovered from a wet conversion gas. For example, it may be advantageous to apply these improvements to an existing plant that does not have facilities for implementation of absorption heat recovery technology. However, the maximum benefit of the process of the invention is realized in an absorption heat recovery plant of the type illustrated in the FIG. 1.

A number of advantages result from elimination of the need for a drying tower by operation of a wet gas system. Avoided is a substantial investment otherwise required for the drying tower itself, and associated circulating pump, piping, pump tank, and cooler. Also avoided is the need for cross flow from the drying tower to the heat recovery tower to transfer water accumulated in the drying operation. There is a consequent reduction in the volume of acid leaving the heat recovery tower acid circuit, which is advantageous because it is difficult to recover in high grade form all the heat contained in the acid flowing out of the heat recovery tower circulating loop. Concentration control is generally simplified throughout the process. Energy recovery is increased because the heat of condensation of water vapor, which is normally removed in the drying tower cooler and lost, is shifted to the heat recovery system where it is recovered in the form of medium pressure steam.

Figure 1:
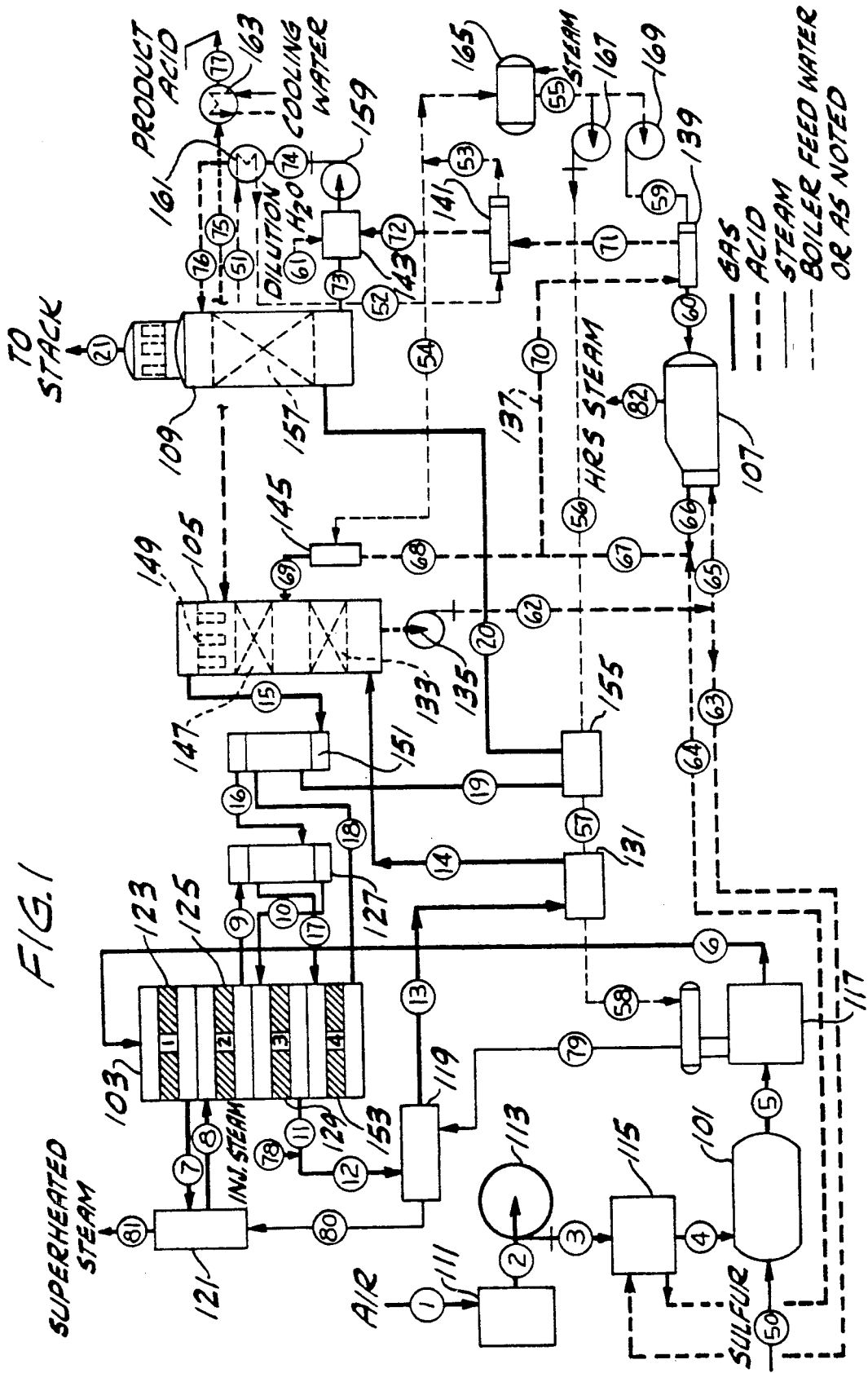
FIG. 1 is a flow sheet illustrating a preferred process embodying the improvements of the present invention.

FIG. 1 depicts the flow sheet for a wet gas acid plant in which elemental sulfur or a source thereof is burned with undried ambient air in a sulfur burner 101 to produce a combustion gas containing sulfur dioxide and oxygen. Alternatively, a sulfur dioxide stream may be derived from such sources as the roasting step of a metal recovery operation, the reference herein to burning or combustion of a sulfur source being intended to include such roasting operations or any other process in which a sulfur source is oxidized to produce a sulfur dioxide-containing gas from which sulfuric acid is produced. Sulfur dioxide in the combustion gas is converted to sulfur trioxide in a converter 103, and gas from the third catalyst stage of the converter is directed to a heat recovery absorption tower 105. Absorption is carried out at high temperature in the heat recovery tower, producing sulfuric acid and generating the heat of absorption. The discharge absorption acid is used for the generation of medium pressure steam in a heat recovery system boiler 107. Exit gas from the heat recovery tower is directed back to the converter 103 where residual sulfur dioxide is converted to sulfur trioxide. Gas from the final converter stage is directed to a final absorption tower 109 where additional sulfuric acid is produced. Gas leaving the final absorption tower is exhausted from the system.

Undried combustion air is drawn into the system through a filter 111 and a compressor 113. The temperature of the combustion air is increased by passage through an air preheater comprising an indirect heat exchanger 115 in which the air is heated by transfer of heat from heat recovery tower discharge absorption acid. In the process illustrated, the combustion air is passed through one side of the exchanger and absorption acid through the other side. It will be understood, however, that heating of the combustion air with absorption heat may also be effected through an intermediary heat transfer fluid, for example a pressurized hot water circulating loop. Generally, the acid entering preheater 115 is at a temperature of at least about 190° C. and the air is heated to a temperature of at least about 140° C. Preferably, the acid enters the heat exchanger at a temperature of at least about 225° C. and the air is heated to a temperature of at least about 175° C.

Air preheater 115 is preferably a shell and tube exchanger having the acid passing through finned tubes constructed of alloys of the type described hereinbelow as suitable for use in contact with high temperature sulfuric acid at concentrations in excess of 98.5%.

The heated air is used to burn sulfur or other sulfur source in sulfur burner 101. Thus, the transfer of heat in the air preheater contributes heat to the combustion gas exhausted from burner 101. The gas exiting the burner is passed through a waste heat recovery unit 117, preferably a steam boiler, where heat is transferred from the combustion gas to a heat transfer fluid. Typically, the combustion gas enters the waste heat boiler at a temperature of about 1160° C. and leaves at a temperature above the dew point. Steam is preferably generated at a pressure of at least about 25 bar gauge, normally in the range of 40 to 60 bar gauge. In the flow sheet illustrated, superheat is imparted to the steam generated in the waste heat boiler by passing the steam through superheaters comprising indirect heat exchangers 119 and 121, in which heat is transferred to the steam from sulfur trioxide-containing conversion gas generated in the converter.

As indicated, combustion air may also be preheated by heat recovery absorption acid in a dry gas system. In the latter instance, however, the amount of heat that can be transferred from the heat recovery absorption acid to the inlet air (or other oxygen-containing oxidizing gas) may be limited by restrictions on maximum acceptable burner temperatures. Thus, the improvement relating to the use of absorption acid for preheating combustion air is especially advantageous in a wet gas process of the type illustrated in FIG. 1. In that system, the cold suction temperature minimizes the horsepower drawn by blower 113 and also results in a relatively low temperature for the air discharged from the blower. The relatively high mass flow rate of wet air required for combustion also helps to maintain burner temperature within acceptable limits, despite the heat energy contributed by preheating the combustion air between blower and burner.

Gas exiting the waste heat boiler 117 enters the first catalyst stage 123 of converter 103. Conversion of sulfur dioxide to sulfur trioxide in stage 123 generates substantial additional high temperature energy, at least a portion of which is recovered in superheater 121 in which heat is transferred from the conversion gas to the steam generated in waste heat boiler 117. Conversion gas exiting superheater 121 enters second catalyst stage 125 of the converter, in which additional sulfur dioxide is converted to sulfur trioxide. The hot gas leaving the second catalyst stage is cooled by transfer of heat to gas returning to the fourth stage of the converter from heat recovery tower 105. Heat transfer from the second stage conversion gas to the returning gas is conducted in a so-called "hot" heat exchanger comprising an indirect heat exchanger 127.

Cooled second stage conversion gas exiting hot heat exchanger 127 passes through third catalyst stage 129 for further conversion of sulfur dioxide to sulfur trioxide. Heat contained in the gas leaving third stage 129 is recovered in superheater 119 by transfer to the steam generated in waste heat boiler 117, and in an economizer 131, in which heat is transferred to boiler feed water for the waste heat boiler.

In a wet gas process, cooling of the gas exiting catalyst stage 129 results in vapor phase reaction of sulfur trioxide and water vapor to produce sulfuric acid vapor. Energy equivalent to a minor portion of this heat of formation is recovered in superheater 119 without condensation of the acid. In accordance with the present invention, a substantial additional fraction of the gas phase heat of formation of sulfuric acid is recovered at relatively high temperature in the economizer. Moreover, the amount of high temperature heat recovered from the economizer and/or the amount of intermediate temperature heat recovered in the heat recovery absorption system is augmented by the injection of water vapor into the gas stream at a point between burner 101 and heat recovery absorption zone 133. Preferably, the water vapor is introduced between catalyst stage 129 and absorption zone 133, more preferably at a point between catalyst stage 129 and economizer 131. Injection between catalyst stage 129 and superheater 119 is especially preferred because it allows for substantial mixing at temperatures sufficient to prevent weak acid condensation upstream of the economizer. Mixing is promoted, inter alia, by the turbulence created by passage over the tubes of the superheater. Thorough mixing upstream of the economizer minimizes concentration gradients and any risk of localized condensation of weak sulfuric acid in the economizer. The energy content of low pressure steam injected at a pressure, for example, of 0.2 to 1 bar gauge, is upgraded by recovery as intermediate pressure steam from the absorption heat recovery boiler 107 or, more preferably, by recovery as high pressure steam through transfer in condensing economizer 131 to high pressure feed water for waste heat boiler 117.

Low pressure steam from a variety of sources may be injected into the gas stream upstream of the condensing economizer. Such sources include, for example, boiler blow down flash, deaerator vent steam, the low pressure port on a steam turbine for an electrical generator, steam generated from low temperature sulfuric acid, heat recovery absorption system steam, and low pressure steam from outside the sulfuric acid plant. A significant benefit from steam injection is realized if steam in which the vapor phase heat of formation is ultimately recovered has a pressure substantially higher than the pressure at which steam is introduced into the gas stream. The greater this difference in pressure, the greater the benefit of the energy quality upgrade that is achieved through steam injection. For this reason, it is generally not preferred that heat recovery system steam, which may typically have a pressure of 10 bar gauge, be used as injection steam. As a minimum, on the other hand, the injected steam must have a pressure slightly in excess of the pressure of the gas stream into which it is injected, i.e., at least about 0.2 bar. Generally, the pressure of the injected steam may practically range from about 0.2 to about 10 bar gauge, preferably about 0.3 to about 3 bar gauge, more preferably about 0.3 to about 1 bar gauge.

In accordance with the invention, the steam in which the vapor phase heat of formation of sulfuric acid is ultimately recovered has a pressure at least about 2.5 bar higher than the pressure at which steam is introduced into the gas stream. Preferably the difference is at least about 8 bar. For applications such as that illustrated in FIG. 1, in which the vapor phase heat of formation is transferred to boiler feed water for high pressure steam, the pressure difference between that steam and the injection steam is preferably at least about 25 bar.

It will be understood that, for purposes of the present disclosure, the pressure at which steam (water vapor) is introduced into the gas stream means the pressure of the steam in the supply line immediately prior to any pressure drop that may be incurred in discharging the steam from the supply line into the gas stream.

Steam injection is controlled so that the molar ratio of equivalent water vapor to equivalent sulfur trioxide is maintained at not greater than about 1.05. This ensures that the condensation product in the condensing economizer or heat recovery absorption tower has a concentration greater than the sulfuric acid azeotrope, which is about 99% at 210° C. and about 98.6% at 270° C. These concentrations can be handled using the alloys described herein for use in the tubes of the condensing economizer. However, localized cooling and high water concentration produces weak acid on the steam injection nozzle. Accordingly, this nozzle is preferably constructed of ceramic material to withstand the aggressive corrosive conditions which prevail.

Economizer 131 comprises an indirect heat exchanger in which heat is transferred to a heat transfer fluid, for example, boiler feed water, as illustrated in the system depicted in FIG. 1. Exchanger 131 comprises heat transfer wall means, such as the tubes of a shell and tube type heat exchanger, preferably constructed of an alloy of the type described in copending application Ser. No. 369,301, as discussed in further detail hereinbelow. In a preferred embodiment of the invention, at least a portion of the wall means on the gas stream side of the exchanger is at a temperature below the dew point of the gas stream in the exchanger. Thus, sulfuric acid condenses on the heat transfer wall and heat of formation of the condensing acid is transferred to the boiler feed water.

A condensing economizer may be operated to condense as sulfuric acid as much as about 5 to 20% of the sulfur trioxide generated in the first three catalyst stages of converter 103. Table 1 shows the heat evolved when sulfur trioxide and water react to form sulfuric acid under various phase conditions.

TABLE 1

Sulfuric Acid Heat of Reaction from Standard Heat of Formation (25° C.)

| No. | Reaction Conditions | Heat of Reaction |
|---|---|---|
| (1) | $SO_3 (g) + H_2O (l) \rightarrow H_2SO_4 (l)$ | −31.7 kcal/mole |
| (2) | $SO_3 (g) + H_2O (g) \rightarrow H_2SO_4 (g)$ | −23.3 kcal/mole |
| (3) | $SO_3 (g) + H_2O (g) \rightarrow H_2SO_4 (l)$ | −42.2 kcal/mole |

The gas phase reaction (Equation 2) produces 74% of the heat produced by the normal liquid phase reaction (Equation 1). Transfer of the heat from condensing sulfuric acid to feed water for the waste heat boiler results in the ultimate recovery of both the heat of formation and heat of condensation of sulfuric acid in the form of high grade energy, i.e., steam at a pressure of at least about 30 bar gauge, preferably 40 to 60 bar gauge.

Figure 2:
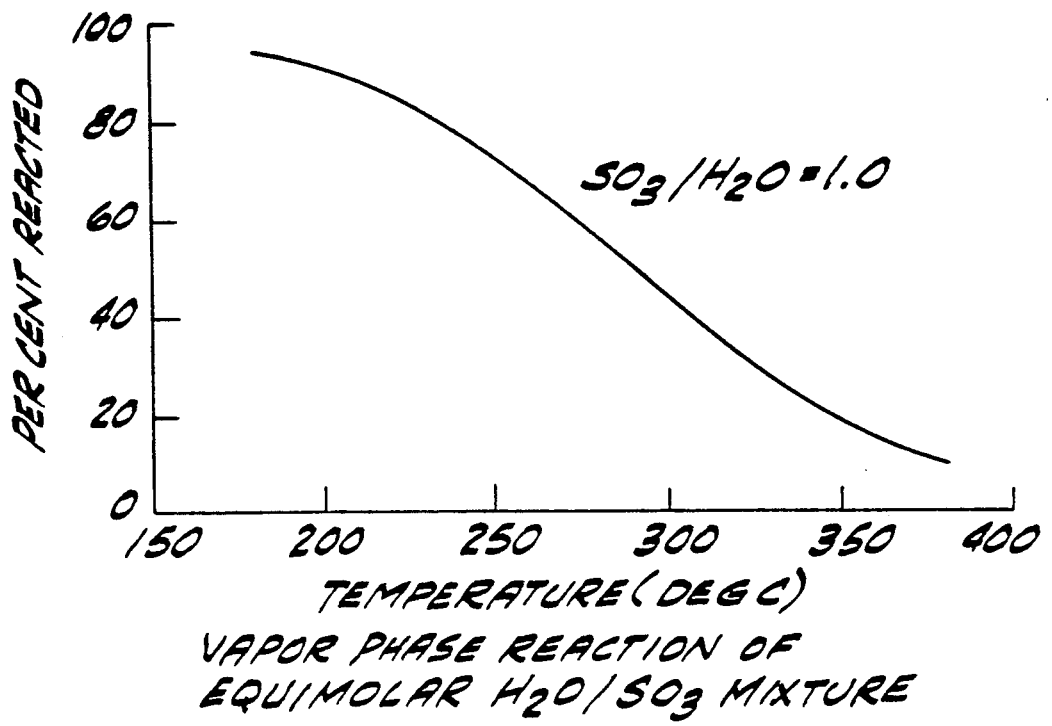
FIG. 2 is a plot showing the vapor phase reaction equilibrium as a function of temperature for the reaction of sulfur trioxide and water to form sulfuric acid in the vapor phase.
Figure 3:
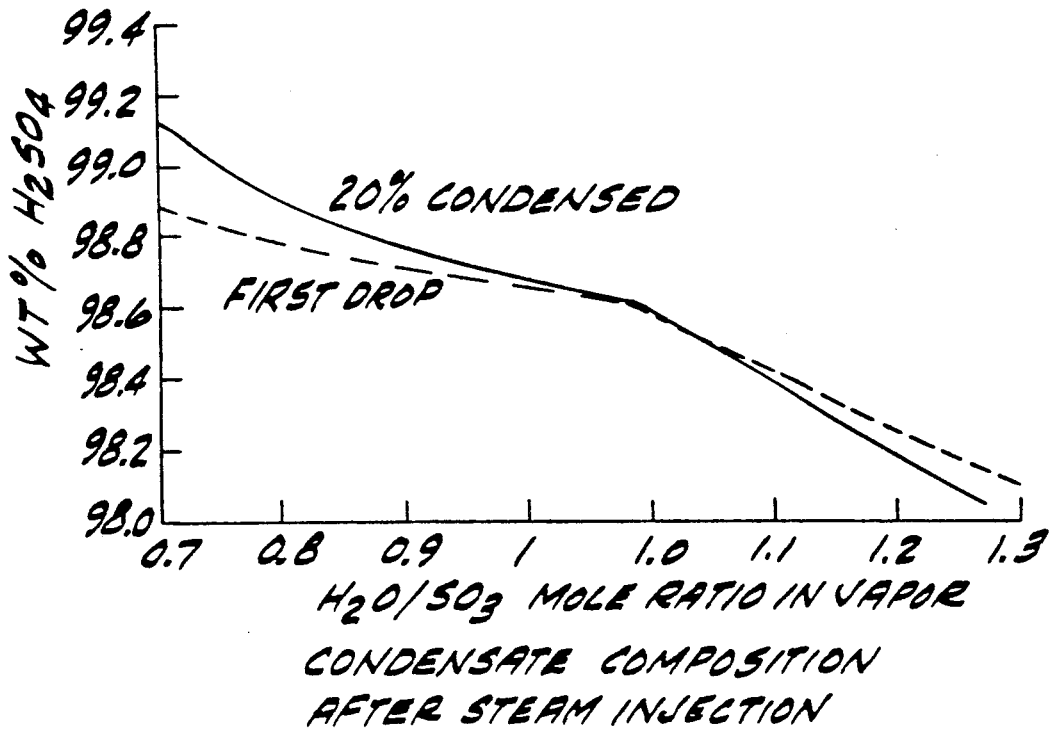
FIG. 3 is a plot showing sulfuric acid condensate composition as a function of the ratio of equivalent water vapor to equivalent sulfur trioxide in the gas phase, for example, after steam injection, the dotted curve showing the composition of the first drop of condensation and the solid curve showing the composition after 20% of condensable components have been condensed.

As indicated by the data of FIG. 2, the conversion of sulfur trioxide to sulfuric acid in the vapor phase increases as the temperature of the vapor phase is lowered. Thus, it is advantageous to lower the temperature in the condensing economizer 131 to the maximum extent compatible with effective operation of the heat recovery tower 105. Not only is the reaction forced to the maximum degree of completion and generation of the heat of formation, but the maximum proportion of the heat of formation and condensation of sulfuric acid is recovered in high grade form by transfer to high pressure boiler feed water for the waste heat boiler 117. Fortuitously, it has been discovered that economizer 131 can be operated to extract a maximum amount of the vapor phase energy of formation of sulfuric acid without the necessity for close control of the fluid flow rates or wall temperatures within the economizer. As illustrated in FIG. 3, the concentration of acid in the condensate varies only very gradually with the water/sulfur trioxide ratio in the gas phase, and consequently does not vary significantly with either the temperature to which the gas is cooled or the wall temperature of the heat exchanger. Thus, it is not necessary to closely control the operation of the condensing economizer to avoid corrosive conditions therein. Consequently, variations in inlet air humidity, or excursions in sulfur flow rate or steam injection rate, do not materially affect the concentration of the acid condensing on the tube walls of the condensing economizer. FIG. 3 shows that as much as 140% of the stoichiometric amount of water vapor may be added by injection without reducing the concentration of the condensing acid below .98%.

It has been found that energy equivalent to about 40 to 70%, most typically about 60%, of the heat of formation of sulfuric acid vapor is recovered by cooling the gas stream between catalyst stage 129 and absorption zone 133. Although the use of superheater 119 is advantageous for imparting superheat to the steam generated in waste heat boiler 117, 40 to 70% recovery of the vapor phase heat of formation may be achieved in economizer 131 alone. Where both superheater 119 and condensing economizer 131 are used, about 70% to about 90%, generally about three fourths, of the recovered heat of formation is transferred in the condensing economizer. Typically, the gas stream entering the condensing economizer has a temperature in the range of between 470° and about 320° C. and an $H_2O/SO_3$ mole ratio of between about 0.2 and about 1.05. The gas stream leaving the condensing economizer has a temperature in the range of about 240° to about 300° C.

Boiler feed water typically enters the economizer at a temperature of between about 110° and about 180° C.

It will be understood that a substantial portion of the vapor phase heat of formation of sulfuric acid can be extracted without condensation in economizer 131. In some circumstances, it may be desirable to operate the economizer under conditions which preclude condensation since this allows the economizer to be constructed of carbon steel instead of a Fe/Cr or Fe/Cr/Ni alloy. Thus, for example, recovery of a substantial fraction of the heat of formation may be achieved without condensation by transferring heat from the gas stream to boiler feed water in a co-current heat exchanger. However, in most instances it is preferred that an alloy exchanger be used and that the tube walls be operated at a temperature low enough to cause condensation thereon, though not so low as to cause nucleation and mist formation within the bulk gas stream. By such means a high portion of the heat of formation, and an appreciable fraction of the heat of condensation, of sulfuric acid is recovered in the form of high pressure steam.

The wet gas stream leaving economizer 131 is directed to the heat recovery tower 105 where it is contacted countercurrently with sulfuric acid in a heat recovery absorption zone 133 within the tower. Zone 133 comprises means, such as packing, for promoting mass transfer and heat transfer between the gas and liquid phases within the zone. The inlet gas to the absorption zone contains sulfur trioxide, water vapor, and sulfuric acid vapor. Contact of the gas with liquid sulfuric acid causes absorption of sulfur trioxide, condensation and absorption of water vapor, and condensation and absorption of sulfuric acid vapor in the liquid sulfuric acid stream. It will be understood that, within the context of this disclosure, the terms "heat of absorption" and "energy of absorption" include all of these various heat effects. Such may also include energy of formation of sulfuric acid in the vapor phase that has not been recovered in condensing economizer 131.

By use of hot acid for absorption in zone 133, two important goals are realized. First, the heat of absorption is generated at relatively high temperature which allows subsequent recovery of this energy at high temperature. Additionally, the use of high temperature acid avoids shock cooling of the gas stream and consequently minimizes the formation of acid mist in the wet gas. FIG. 4 shows the effect of heat recovery tower discharge acid temperature on mist formation in gas entering at 300° C. and two different $H_2O/SO_3$ ratios. Preferably, the temperature of the acid at the exit of zone 133 is no cooler than about 40° C. below, more preferably no more than 20° C. below, the dew point of the inlet gas. Surprisingly, it has been discovered that the gas can be at a temperature below 300° C. as it enters the absorption zone, thereby allowing recovery of the maximum amount of the energy of vapor phase formation and condensation of sulfuric acid in the form of high pressure steam as a result of the transfer of this heat to the high pressure boiler feed water for waste heat boiler 117.

Acid is discharged from the heat recovery stage at a temperature of at least 190° C., generally between about 190° and about 250° C. Preferably, the exit acid temperature should be in the range of between about 210° and about 250° C., the optimum being near the gas dew point. The temperature of the incoming gas is typically in the range of about 240° to about 300° C.

As shown in FIG. 1, the gas flows upward through the packed absorption stage (sometimes referred to hereinafter as the "heat recovery zone" or "heat recovery stage"). It will be understood that other gas liquid contacting devices such as a countercurrent tray tower or a co-current venturi absorber can be used in lieu of a packed tower.

Sulfuric acid is delivered to the top of the absorption zone 133 at a temperature preferably between about 170° and about 220° C., and a concentration broadly in the range of between about 98.5% and about 99.5%. However, because injection of steam into the gas leaving catalyst stage 129 causes the equivalent water to sulfur trioxide mole ratio in the gas phase entering zone 133 to be in the range of about 0.2 to 1.05, preferably 0.7 to 1.0, it is preferred that the strength of the acid entering the tower be in the range of about 99% to about 99.5%, this concentration remaining essentially constant throughout the absorption zone.

Although the absorption stage is operated at elevated temperatures, at least about 90% of the equivalent sulfur trioxide in the inlet gas stream is absorbed in the heat recovery stage. For purposes of this disclosure "equivalent sulfur trioxide" is defined as the molar sum of the sulfur trioxide and sulfuric acid in the gas phase. Similarly, "equivalent water vapor" is the molar sum of water vapor and sulfuric acid in the gas phase.

Sulfuric acid leaving the absorption zone 133 flows to a circulating pump 135, at the discharge of which the acid stream is divided into two streams, one containing a major proportion of the acid. This major stream is conducted to indirect heat exchanger 107 where the energy of absorption is recovered by transfer of heat to another fluid. The minor portion of the absorption acid discharge stream is directed to preheater 115 for transfer of heat to air that is used for combustion of the sulfur source. Preferably, as illustrated in FIG. 1, heat exchanger 107 comprises a boiler for the generation of medium pressure steam, for example, steam having a gauge pressure between approximately 1.5 and 20 bar and normally between about 3 and about 12 bar. In a particularly preferred mode of operation, the acid leaving the heat recovery absorption zone is maintained at a temperature greater than 200° C., and steam is generated in heat recovery boiler 107 at a pressure of 3.0 bar gauge or greater, preferably greater than 10 bar gauge. Steam generated in heat exchanger 107 by transfer of the absorption heat may be used in a variety of applications.

Any portion of the vapor phase heat of formation of sulfuric acid not recovered by transfer to high pressure steam in superheater 119 and transfer to high pressure boiler feed water in economizer 131 is transferred in heat recovery zone 133 to the circulating absorption acid. Most if not all of the heat of condensation of the acid formed in the vapor phase is also transferred to the absorption acid. This heat energy is ultimately recovered in the form of medium pressure, e.g., 3.0 bar to 10 bar, steam in heat recovery system boiler 107.

Acid streams returning from heat recovery system boiler 107 and air preheater 115 are combined and at least a portion of the combined stream is recirculated to the heat recovery tower at a point above absorption stage 133. To maintain a constant volume of acid in the circuit another portion of the combined return acid stream is removed from the circuit as overflow acid through line 137. Additional heat is recovered from the overflow acid by passing it in series through indirect heat exchangers 139 and 141 which comprise preheaters for feed water to heat recovery system boiler 107 and deaerator 165, respectively. Acid leaving preheater 141 is delivered to a pump tank 143 containing circulating acid for final absorption tower 109.

Trim control of the concentration of the heat recovery absorption system circulating acid is provided by dilution of the returning acid in a a mixing stage 145. Mixing water may be added in vapor form, thereby providing for recovery of the heat of vaporization at relatively high temperature in the heat recovery boiler 107.

As a result of the high temperature operation of the heat recovery stage, the gas stream exiting the top of this stage is relatively hot and is in contact with hot acid. This in turn results in stripping sulfuric acid from the acid stream into the gas stream. Although the absorption efficiency of the heat recovery stage is at least about 90%, high temperature operation of the heat recovery stage also results in some unabsorbed $SO_3$ passing through that stage. Gas exiting the top of the heat recovery stage is therefore directed to a condensing stage 147 for absorption of residual sulfur trioxide and condensation of sulfuric acid vapor. Condensing stage 147 contains means for promoting gas/liquid contact and mass transfer and heat transfer therebetween. Preferably, this stage comprises a countercurrent packed section. Relatively cool acid having a concentration of about 98.5% is fed to the top of this stage and gas leaving the heat recovery stage at a temperature of about 170° to about 230° C. enters the bottom of the condensing stage.

At the gas exit from the condensing stage, it is preferred that the temperature of the acid entering be below about 120° C., most preferably between about 60° and 80° C. On passage through the condensing stage the gas stream is typically cooled to a temperature in the range of between about 75° and 140° C. normally between about 80° and about 120° C.

The acid flow rate in the condensing stage is maintained at a rate low enough that the acid leaves the stage at a temperature which approaches the temperature of the acid entering the heat recovery stage. Thus, the weight basis flow rate of the absorption stage acid is at least above four times, preferably between about four and about twenty times, that of the condensing stage acid stream.

Gas leaving condensing stage 147 passes through a mist eliminator 149 within tower 105 and then exits the tower returning to the converter via an indirect heat exchanger comprising a so-called cold heat exchanger 151 and hot heat exchanger 127. The return gas is thus heated to a temperature appropriate for further conversion of sulfur dioxide to sulfur trioxide in final conversion stage 153.

In cold heat exchanger 151, the gas flowing to final conversion stage 153 is preheated by transfer of heat from the gas leaving that same stage, while in hot heat exchanger 127 the return gas is preheated by transfer of heat from gas leaving second catalyst stage 125.

Fourth stage conversion gas leaving cold heat exchanger 151 is directed to final absorption tower 109 through an indirect heat exchanger comprising an economizer 155 where heat is transferred from the conversion gas to boiler feed water for the waste heat boiler 117.

Absorption of residual sulfur trioxide is carried out in final absorption tower 109 by countercurrent flow of sulfuric acid and the gas over a packed absorption zone 157. Acid is circulated over the tower from pump tank 143 via a circulating pump 159 and an acid cooler 161. Dilution water for the final absorption tower is added at pump tank 143. Acid produced in the final absorption step is removed from the process via a cooler 163.

In the process of FIG. 1, boiler feed water passes through final absorption acid cooler 161, preheater 141, both high nickel and high molybdenum. However, alloys which contain high nickel and very low molybdenum, or low nickel and moderate amounts of molybdenum are usually found to be acceptable. Particular alloys found suitable for use in contact with liquid phase sulfuric acid at high temperature include those having UNS designations S30403, S30908, S31008, S44627, S32304, and S44800.

TABLE 2

| Alloy UNS No. | % by weight - Components of Alloy | | | | | |
|---|---|---|---|---|---|---|
| | C | Mn | Si | Cr | Ni | Others |
| S30403 | 0.03 | 2.00 | 1.00 | 18.0–20.0 | 8.0–12.0 | 0.045 P; 0.03 S; 0.10 N |
| S30908 | 0.08 | 2.00 | 1.00 | 22.0–24.0 | 12.0–15.0 | 0.045 P; 0.03 S |
| S31008 | 0.08 | 2.00 | 1.50 | 24.0–26.0 | 19.0–22.0 | 0.045 P; 0.03 S |
| S44627 | 0.01 | 0.40 | 0.40 | 25.0–27.5 | 0.50 | 0.02 P; 0.02 S; 0.75–1.5 Mo; 0.015 N; 0.2 Cu; 0.5(Ni + Cu); 0.05–0.20 Nb |
| S32304 | 0.030 | 2.50 | 1.0 | 21.5–24.5 | 3.0–5.5 | 0.040 P; 0.040 S; 0.05–0.2 N; 0.05–0.6 Mo; 0.05–0.6 Cu |
| S44800 | 0.010 | 0.30 | 0.20 | 28.0–30.0 | 2.0–2.5 | 0.025 P; 0.02 S; 3.5–4.2 Mo; 0.15 Cu; |
| The balance in each instance is essentially iron. | | | | | | | and a deaerator 165. Feed water leaving deaerator 165 is divided. One portion flows to a high pressure boiler feed water pump 167, the other to a heat recovery boiler feed water pump 169. Water from pump 169 is fed to the heat recovery system via preheater 139. Water from pump 167 is fed to waste heat boiler 117 via economizers 155 and 131.

The process of the invention is uniquely capable of recovering not only process heat but latent heat of the humidity of incoming air in the form of high grade energy. In the latter connection, it may further be noted that a wet scrubber may be substituted for air filter 111, and the humidity picked up in the scrubber ultimately recovered in the form of high temperature energy. Because the air leaving the scrubber is essentially at its wet bulb temperature, a significant increment of energy may be picked up at this point.

Wet sulfur trioxide-containing gas can be handled in carbon steel equipment provided that the gas temperature is kept above the dew point. In the preferred embodiments of the present invention, the dew point is generally high, so that carbon steel equipment is suitable only for the waste heat boiler, high temperature superheaters, the gas heat exchangers 127 and 151, and the economizer 155. Equipment operated below the dew point or otherwise in contact with hot liquid sulfuric acid, such as the condensing economizer, heat recovery system boiler, heat recovery system boiler feed water preheaters, and air preheater, has heat transfer surfaces constructed of alloys or other corrosion resistant materials. There are a number of stainless steel and nickel alloys that can be used in high temperature strong sulfuric acid service. Alloy performance can be characterized by a corrosion index (CI) which is defined in terms of alloy composition by the following relationship:

$$CI = 0.4[Cr] - 0.05[Ni] - 0.1[Mo] - 0.1[Ni] \times [Mo]$$

Where:
[Cr] = Weight percent chromium in the alloy
[Ni] = Weight percent nickel in the alloy
[Mo] = Weight percent molybdenum in the alloy.

Alloys which work best in high temperature strong sulfuric acid service have been found to have a corrosion index greater than 7, preferably greater than 8.

The alloys most likely to exhibit low corrosion rates are those with the highest corrosion index. As indicated by the corrosion index formula, high chromium is desirable, and it is preferable to avoid alloys which have For safe and corrosion free start-ups and shut downs two extra ducts may be added to the process flow diagram of FIG. 1. These include a recycle duct from the final absorbing tower outlet to the blower inlet and a heat recovery system bypass from the third catalyst stage outlet to the fourth catalyst stage outlet. In this operation, initial heat up is according to conventional practice in which fuel is burned in the sulfur burner and the combustion products of the fuel vented after the waste heat boiler 117.

For cooling and purging of the plant, dry air is recycled through the entire plant. Residual sulfur trioxide and heat are removed in the final tower and its acid cooler. Also during start-up, liquid dilution water is preferably used. This lowers the dew point by about 60° C. in the gas entering superheater 119. Steam injection is not initiated until all heat exchange surfaces have reached steady state operating temperature.

EXAMPLE 1

Set forth in Table 2 are typical temperatures of the various process streams in a wet gas sulfur burning sulfuric acid manufacturing process operated in accordance with the flow sheet of FIG. 1. Also set forth are temperatures and pressures of steam generated in the process.

TABLE 2

| Stream # | Temperature (°C.) | Stream # | Pressure (Bar Gauge) | Temperature (°C.) |
|---|---|---|---|---|
| 1 | 38 | 56 | | 138 |
| 2 | 38 | 57 | | 162 |
| 3 | 87 | 58 | | 266 |
| 4 | 192 | 59 | | 138 |
| 5 | 1161 | 60 | | 184 |
| 6 | 420 | 61 | | 32 |
| 7 | 597 | 62 | | 227 |
| 8 | 440 | 63 | | 227 |
| 9 | 528 | 64 | | 193 |
| 10 | 440 | 65 | | 227 |
| 11 | 469 | 66 | | 200 |
| 12 | 454 | 67 | | 198 |
| 13 | 367 | 68 | | 198 |
| 14 | 271 | 69 | | 199 |
| 15 | 83 | 70 | | 198 |
| 16 | 307 | 71 | | 179 |
| 17 | 425 | 72 | | 93 |
| 18 | 447 | 73 | | 91 |
| 19 | 222 | 74 | | 93 |
| 20 | 147 | 75 | | 70 |
| 21 | 77 | 76 | | 77 |
| 50 | 132 | 77 | | 43 |

TABLE 2-continued

| Stream # | Temperature (°C.) | Stream # | Pressure (Bar Gauge) | Temperature (°C.) |
|---|---|---|---|---|
| 51 | 44 | 78 | 0.4 | 109 |
| 52 | 86 | 79 | 62 | 279 |
| 53 | 131 | 80 | 60 | 351 |
| 54 | 131 | 81 | 59 | 482 |
| 55 | 138 | 82 | 11 | 187 |

EXAMPLE 2

A pilot plant was operated using steam injection to supply dilution water. Over 1000 hours of operation were logged in accordance with this process flow scheme. Corrosion coupons were inserted in certain process locations and measurements made of corrosion rates. Set forth in Table 3 are the corrosion rates for coupons of various materials at a point approximately 1.5 meters downstream of the steam injection nozzle. This data was taken with 100% of dilution water for the heat recovery tower being supplied by steam injection, and with the metal surfaces being below the dew point of the gas.

TABLE 3

Corrosion Rates Measured in Pilot Plant Downstream of Equimolar Steam Injection Average Metal Temperature = 235° C.

| Alloy | Corrosion Rate (mm/a) |
|---|---|
| S30403 | 0.020 |
| S30908 | 0.013 |
| S31008 | 0.008 |

What is claimed is:

1. In a process for the manufacture of sulfuric acid, comprising combustion of a source of sulfur with an oxygen-containing gas in a burner to produce a combustion gas stream comprising sulfur dioxide and oxygen, passage of the gas stream through a plurality of catalyst stages for progressive conversion of sulfur dioxide to sulfur trioxide, recovery of heat in useful form by cooling the gas stream exiting each of said catalyst stages, passage of the cooled gas stream from one of said stages through an absorption zone where the gas stream is contacted with sulfuric acid for removal of sulfur trioxide from the gas phase, and return of the gas stream from said zone to a further stage of said plurality of stages, the improvement which comprises:

introducing water vapor into the gas stream at a point between said burner and the said absorption zone, at least a portion of the water vapor reacting with sulfur trioxide in the gas phase to produce sulfuric acid and thereby generate the heat of formation of sulfuric acid in the gas phase and recovering heat energy from the vapor phase heat of formation of sulfuric acid by transfer of heat in an indirect heat exchanger from said gas stream to steam having a pressure at least about 8 bar higher than the pressure of said water vapor as introduced into the gas stream or to feed water from which said steam is generated wherein said indirect heat exchanger is located upstream of said absorption zone.

2. An improved process as set forth in claim 1 wherein said water vapor is introduced into said gas stream between said one stage and said indirect heat exchanger.

3. An improved process as set forth in claim 1 wherein said steam is generated at a pressure of at least about 25 bar gauge.

4. An improved process as set forth in claim 3 wherein the pressure of said steam is at least about 15 bar higher than the pressure at which water vapor is introduced into said gas stream.

5. An improved process as set forth in claim 4 wherein the pressure of said steam is at least about 40 bar higher than the pressure at which water vapor is introduced into said gas stream.

6. An improved process as set forth in claim 1 wherein said indirect heat exchanger comprises an economizer in which heat is transferred from said gas stream to said feed water.

7. An improved process as set forth in claim 6 wherein said economizer comprises heat transfer wall means between said gas stream and said feed water, at least a portion of said wall means on the gas stream side thereof being at a temperature below the dew point of the gas stream entering the economizer.

8. An improved process as set forth in claim 6 wherein said steam is superheated by transfer of heat from said gas stream in an indirect heat exchanger that is between said one stage and said economizer with respect to the flow of said gas.

9. An improved process as set forth in claim 8 wherein between about 40% and about 70% of the heat of formation of sulfuric acid in said gas stream is recovered by transfer of heat to said steam in said superheater and said economizer.

10. An improved process as set forth in claim 8 wherein to between about 70% and about 90% of the gas phase heat formation of sulfuric acid that is transferred to said steam is transferred in said economizer.

11. An improved process as set forth in claim 7 wherein the material of construction of said heat transfer wall means comprises an iron/chromium, nickel/chromium, or iron/chromium/nickel alloy having a composition which has a corrosion index, CI, $\geq 7$ corresponding to the algorithm:

$$CI = 0.4(Cr) - 0.05(Ni) - 0.1(Mo) - 0.1(Ni) \times (Mo)$$

where:
(Cr) = the % by weight of chromium in the alloy
(Ni) = the % by weight of nickel in the alloy
(Mo) = the % by weight of molybdenum in the alloy.

12. An improved process as set forth in claim 11 wherein said material of construction is selected from the group consisting of UNS alloy S30403 containing between about 18.0 and about 20.0% by weight chromium, between about 8.0 and about 12.0% by weight nickel, up to about 0.03% by weight carbon, up to about 2.00% by weight manganese, up to about 1.00% by weight silicon, up to about 0.045% by weight phosphorus, up to about 0.03% by weight sulfur, and up to about 0.10% by weight nitrogen, UNS alloy S30908 containing between about 22.0 and about 24.0% by weight chromium, between about 12.0 and about 15.0% by weight nickel, up to about 0.08% by weight carbon, up to about 2.00% by weight manganese, up to about 1.00% by weight silicon, up to about 0.045% by weight phosphorus, and up to about 0.03% by weight sulfur, UNS alloy S31008 containing between about 24.0 and about 26.0% by weight chromium, between about 19.0 and about 22.0% by weight nickel, up to about 0.08% by weight carbon, up to about 2.00% by weight manganese, up to about 1.50% by weight silicon, up to about 0.045% by weight phosphorus, and up to about 0.03% by weight sulfur, UNS alloy S44627 containing between about 25.0 and about 27.5% by weight chromium, up to about 0.50% by weight nickel, up to about 0.01% by weight carbon, up to about 0.40% by weight manganese, up to about 0.40% by weight silicon, up to about 0.02% by weight phosphorus, up to about 0.02% by weight sulfur, between about 0.75% and about 1.5% by weight molybdenum, up to about 0.015% by weight nitrogen, up to about 0.2% by weight copper, up to about 0.5% by weight nickel plus copper and between about 0.05% and about 0.20% by weight niobium, UNS alloy S32304 containing between about 21.5% and about 24.5% by weight chromium, between about 3.0 and about 5.5% by weight nickel between about 0.05 and about 0.6% by weight molybdenum, between about 0.05 and about 0.6% by weight copper, between about 0.05 and about 0.2% by weight nitrogen, up to about 0.030% by weight carbon, up to about 2.5% by weight manganese, up to about 1.0% by weight silicon, up to about 0.04% by weight phosphorus, and up to about 0.04% by weight sulfur, and UNS alloy S44800 containing between about 2.0 and about 2.5% by weight nickel, up to about 0.010% by weight carbon, up to about 0.30% by weight manganese, up to about 0.20% by weight silicon, up to about 0.025% by weight phosphorus, up to about 0.02% by weight sulfur, between about 2.5 and about 4.2% by weight molybdenum, and up to about 0.15% by weight copper.

13. An improved process as set forth in claim 1 wherein the pressure of said water vapor as introduced into said gas stream is no greater than about 10 bar.

14. An improved process as set forth in claim 13 wherein the pressure of said water vapor as introduced into said gas stream is between about 0.2 and about 3 bar.

15. An improved process as set forth in claim 1 wherein the pressure of said water vapor as introduced into said gas stream is between about 0.2 and about 1 bar.

16. An improved process as set forth in claim 1 wherein the exit gas from said heat recovery absorption stage is contacted with sulfuric acid in a condensing stage for absorption of residual sulfur trioxide and condensation of sulfuric acid vapor, said contact in said condensing stage being carried out before said exit gas is either exhausted from the process or catalytically oxidized to produce additional sulfur trioxide.

17. An improved process as set forth in claim 1 wherein the dew point of the gas stream entering the heat recovery stage does not exceed the temperature of the discharge sulfuric acid stream by more than about 40° C.

18. An improved process as set forth in claim 1 wherein said combustion gas is a wet gas and the gas exiting said one catalyst stage is a wet conversion gas.

* * * * *

UNITED STATES PATENT AND TRADEMARK OFFICE
CERTIFICATE OF CORRECTION

PATENT NO.  : 5,130,112

DATED     : July 14, 1992

INVENTOR(S) : Donald R. McAlister et al.

It is certified that error appears in the above-identified patent and that said Letters Patent is hereby corrected as shown below:

Column 14, claim 10, line 33, "wherein to between" should read ---wherein between---.

Column 15, claim 12, lines 25-26, "S44800 containing between about 2.0" should read ---S44800 containing between about 28.0 and about 30.0% by weight chromium, between about 2.0---.

Column 16, claim 12, line 1, "2.5 and about" should read ---3.5 and about---.

Signed and Sealed this

Twenty-eighth Day of September, 1993

Attest:

BRUCE LEHMAN

Attesting Officer

Commissioner of Patents and Trademarks